June 24, 1924.

W. G. HEGINBOTTOM

SPRING PISTON

Filed June 16, 1920   2 Sheets-Sheet 1

1,498,689

Inventor
W. G. Heginbottom,
By
Attorney

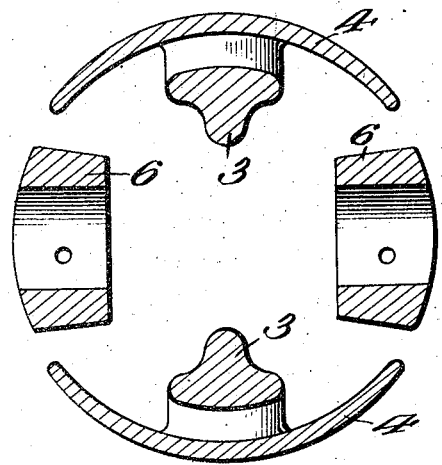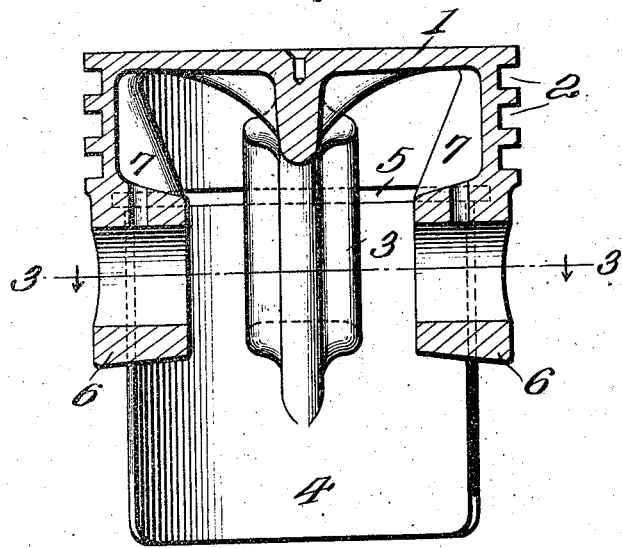

Patented June 24, 1924.

1,498,689

UNITED STATES PATENT OFFICE.

WALTER G. HEGINBOTTOM, OF FLINT, MICHIGAN, ASSIGNOR OF ONE-HALF TO JACOB R. FRANCIS, OF FLINT, MICHIGAN

SPRING PISTON.

Application filed June 16, 1920. Serial No. 389,517.

*To all whom it may concern:*

Be it known that I, WALTER G. HEGINBOTTOM, a citizen of the United States, residing at Flint, in the county of Genesee and State of Michigan, have invented certain new and useful Improvements in Spring Pistons, of which the following is a specification, reference being had therein to the accompanying drawing.

This invention relates to a certain new and useful improvement in a spring piston for an internal combustion engine, the object being to provide a piston with resilient guide members for guiding the piston in the cylinder so as to eliminate piston slap.

Another and further object of the invention is to provide a piston which is composed of a head having arms provided with curved guiding members separated from the piston head proper so as to carry off the heat from the center of the piston.

A still further object of the invention is to provide a piston with guide members separated by large gaps so as to compensate for expansion.

Another and further object of the invention is to provide a piston which is exceedingly simple and cheap in construction and one which can be formed in such a manner that the piston head proper is formed of such a size that a clearance is provided to prevent the same from coming in contact with the walls of the cylinder, the piston being guided by resilient guide members which are milled to substantially the same size as the cylinder, the resiliency of the same allowing the guide members to expand and contract.

Other and further objects and advantages of the invention will be hereinafter set forth and the novel features thereof defined by the appended claims.

In the drawings,

Figure 3 is a section taken on line 3—3 of Figure 4; and

Figure 4 is a section taken on line 4—4 of Figure 1.

Figure 1:
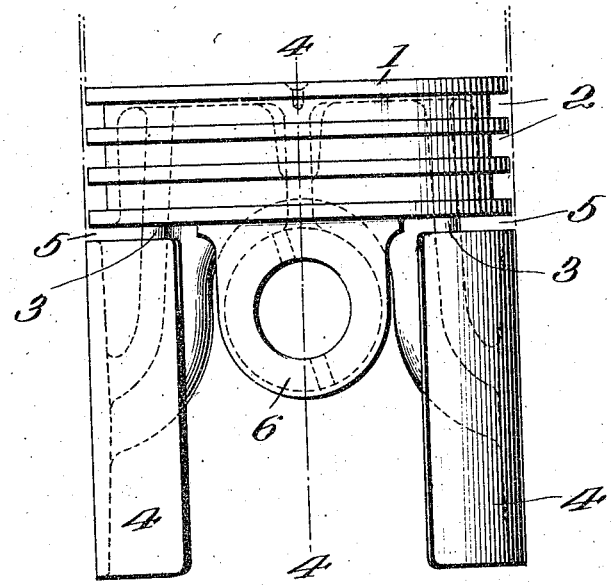
Figure 1 is a side elevation of a piston constructed in accordance with my invention.
Figure 2:
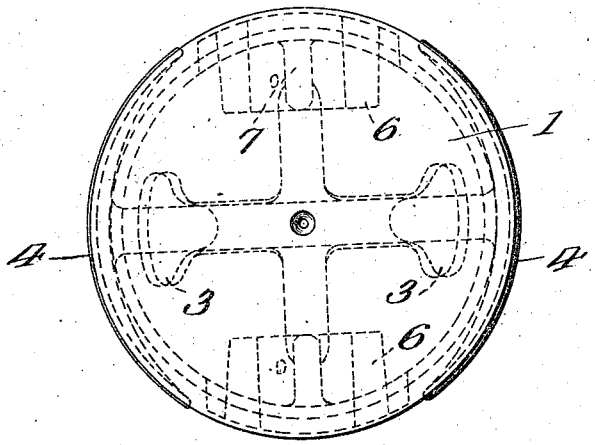
Figure 2 is an end view of the same.

In constructing a piston in accordance with my invention which is preferably formed of aluminum I provide a cup-shaped head 1 which is machined in accordance with the regular practice in order to provide a clearance between the walls of the cylinder and the outer face of the head. The outer face of the walls of the cup-shaped piston 1 are provided with circumferential grooves 2 forming seats for piston rings. Extending from the inside of the disk portion of the cup-shaped piston are arms 3 provided with circular guide members 4 which are struck on the arc of a circle so as to fit tightly within the cylinder. The arms 3 are substantially T-shaped in cross section as clearly shown and are connected to the head of the cup-shaped piston by a connecting web as clearly shown and are resilient to a certain extent so as to allow the guide members 4 to expand and contract in order to contact with the walls of the cylinder in such a manner that piston slap is prevented, the piston being guided by the guide members alone in its movement in the cylinders.

In constructing the piston it is preferably cast of aluminum with the guide members 3 integral with the head 1, the same being separated therefrom at 5 by sawing the same, it of course being understood that after the piston has been cast and turned, the guide members are separated by a saw cut from the piston head proper and the guides then ground to a diameter of the cylinder. By separating the guide members from the piston proper the heat is prevented from being transferred from the walls of the piston to the guide members. In Figure 1 I have shown in dotted lines the outer face of the guide members extended to show the difference in diameter between the piston head proper and the guide members.

Arranged between the oppositely disposed guide members 4 are piston ring bosses 6 cast integral with the head 1 and provided with supporting braces 7 which are so constructed as to retard the travel of heat from the head to the pin bosses.

From the above description it will be seen that a piston has been produced composed of a cup-shaped head reduced in diameter to provide a clearance in connection with a pair of curved guide members of a greater diameter for contacting with the cylinder in which the piston is placed for guiding the piston in its movement, the guide members being carried by downwardly extending arms formed on the interior of the disk portion of the head, which arms have a continuous web portion in order to produce arms substantially T-shaped in cross section. This construction provides resilient guide members as the arms being connected to the interior of the disk portion of the head and not to the circular wall of the disk are free to yield under expansion whereby a piston is produced which eliminates piston slap, compensates for expansion and contraction and also provides means for carrying off the extreme heat from the center of the piston head and I have found in practice that a piston constructed as herein shown and described when in use in the cylinder of an internal combustion engine decreases the oil consumption without affecting the efficiency of the lubrication of the piston.

What I claim is:—

1. A piston for internal combustion engines having a cup-shaped head provided with downwardly extending resilient arms, the arms being secured to the interior of the disk portion of the head and provided with curved outer ends and curved guide members having their central portions secured to the ends of said arms.

2. A piston for internal combustion engines comprising a cup-shaped head having peripheral ring receiving grooves, said head being provided with wrist pin bosses, the interior of said piston being provided with resilient arms substantially T-shaped in cross section having curved ends and curved guide members carried by the ends of said arms, said curved guide members being separated from the piston and connected to the arms intermediate their ends.

In testimony whereof I have hereunto affixed my signature in the presence of two witnesses.

W. G. HEGINBOTTOM.

Witnesses:
 Wm. H. Alexander,
 Geo. Taft.